United States Patent [19]

Hucker

[11] 4,139,807
[45] Feb. 13, 1979

[54] ROTOR SHORT-CIRCUITING SWITCH
[75] Inventor: David J. Hucker, Rockford, Ill.
[73] Assignee: Sundstrand Corporation, Rockford, Ill.
[21] Appl. No.: 815,068
[22] Filed: Jul. 12, 1977
[51] Int. Cl.² ............................................. H02P 1/50
[52] U.S. Cl. .................................................. 318/718
[58] Field of Search .............. 318/167, 174, 176, 181, 318/183, 193

[56] References Cited
U.S. PATENT DOCUMENTS

| | | | |
|---|---|---|---|
| 3,100,279 | 8/1963 | Rohner | 318/193 X |
| 3,293,518 | 12/1966 | Neumann | 318/176 |
| 3,308,362 | 3/1967 | Neumann et al. | 318/193 X |
| 3,818,294 | 6/1974 | Glukhov et al. | 318/193 X |

Primary Examiner—Gene Z. Rubinson
Attorney, Agent, or Firm—Wegner, Stellman, McCord, Wiles & Wood

[57] ABSTRACT

A transistor switch short-circuits the main field rotor winding of a synchronous machine during start-up. A transistor is connected across the main field rotor winding and is responsive to the polarity of the voltage induced in the main field rotor winding by the main stator winding. When the voltage is of one polarity, the transistor conducts to short-circuit the main field rotor winding. When the voltage across the main rotor winding is of the opposite polarity, diodes limit the voltage buildup. The transistor which shorts the main field rotor winding is rendered inoperative when the machine is operating at or near synchronous speed.

7 Claims, 3 Drawing Figures

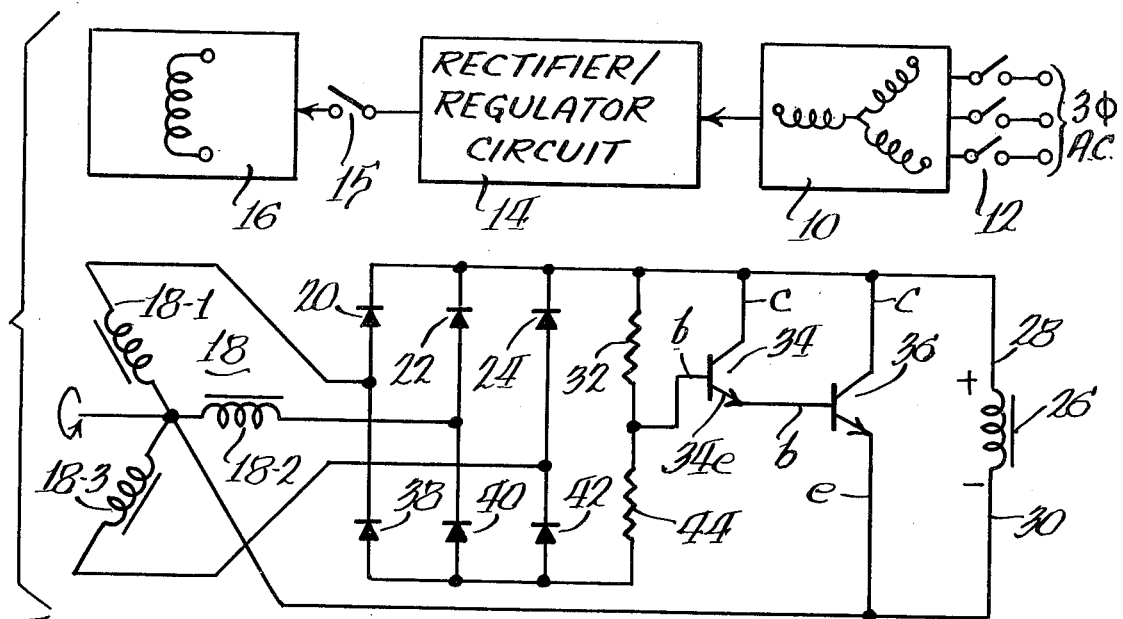
Fig. 1.
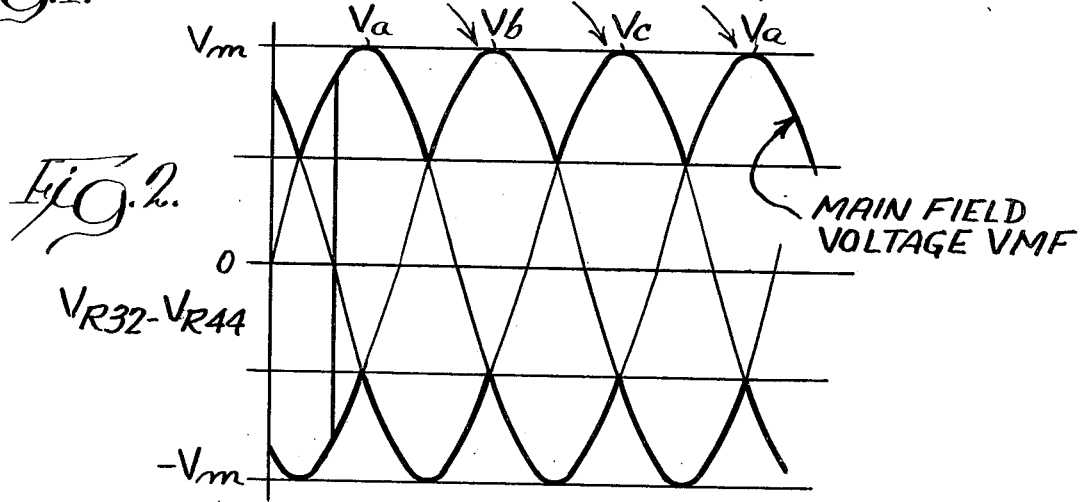
Fig. 2. EXCITER OUTPUT VOLTAGES
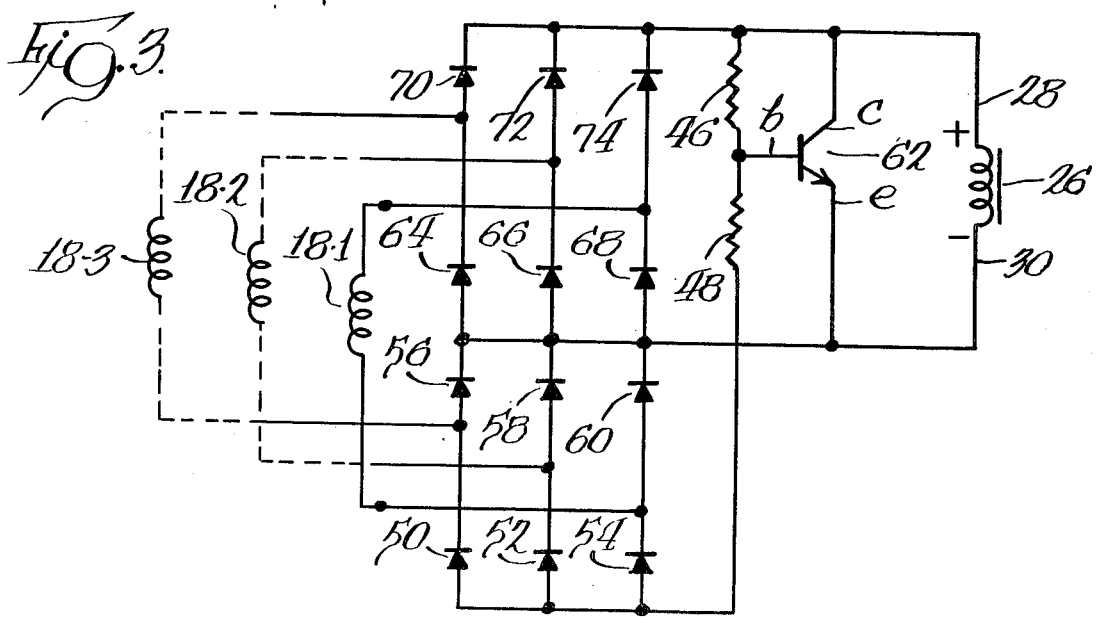
Fig. 3.

ROTOR SHORT-CIRCUITING SWITCH

BACKGROUND OF THE INVENTION

This invention relates to synchronous machines and, more particularly, to a switch for short-circuiting the main field rotor winding during induction start.

An AC voltage applied to the main stator winding of a synchronous machine, employed as a motor, causes the rotor to accelerate to synchronous speed. Acceleration of the rotor occurs as the AC voltage is impressed on the damper bars which are used as a squirrel cage during start-up. The AC voltage is also impressed upon the main field rotor winding. When the rotor is at standstill, or slowly rotating, high voltages tend to be developed in the main field rotor winding. These voltages are not desirable and must be minimized during start-up to prevent damage to the electronic components and windings.

The prior art discloses a number of essentially resistant-free paths for short-circuiting the main field winding of a synchronous motor during start-up. These include bypass circuits for either short-circuiting the main field or for providing a resistive bypass during start-up. Most of the circuits for shorting the main field winding employ SCR's and zener diodes which provide a current bypass path during the start-up of the synchronous machine. Also, centrifugal switches have been employed to disconnect the main field rotor winding from the remainder of the circuit during start-up. These have been unreliable because they use mechanical linkages and contacts, and are relatively inaccessible.

SUMMARY OF THE INVENTION

In accordance with the present invention, a circuit shorts the main field rotor winding during an induction start, without the use of mechanical switches, SCR's or zener diodes. A transistor control switch is coupled across the main field rotor winding of a synchronous machine for shorting the main field rotor winding during start-up. The ON/OFF condition of the transistor is responsive to the polarity of the voltage induced across the main field rotor winding and is ON when the voltage is of one polarity and OFF when the voltage is of the other polarity. Diodes prevent excessive voltage buildup in the main field rotor winding when the transistor is OFF. When the speed of the rotor reaches a level at or near synchronous speed, current is provided to the exciter field winding. This establishes a voltage which is induced in the exciter armature winding. The voltage from the exciter armature winding biases the transistor control switch OFF. The transistor control switch remains OFF as long as current is received from the exciter armature winding. The shorting of the main field rotor winding during start-up protects circuit components and windings.

One object of the present invention is to provide a transistorized circuit for shorting the main field winding of a synchronous machine during start-up.

Another object of the present invention is to provide a transistor circuit, responsive to the polarity of the voltage impressed on the main field winding, for shorting the winding when there is no voltage from the exciter armature winding, as during start-up.

Other objects and feature of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

BRIEF DESCRIPTION OF THE DRAWINGS

FIG. 1 depicts, in block form, the components to be mounted on the stator of a synchronous machine and, in schematic form, the improved circuit to be mounted for rotation on a rotor;

FIG. 2 is a waveform of the voltages developed by the circuit in FIG. 1; and

FIG. 3 is another embodiment of the improved rotor-mounted circuit.

DESCRIPTION OF PREFERRED EMBODIMENTS

Referring to FIG. 1, three-phase voltage from an AC generator (not shown) is provided to main stator winding 10 in the well known manner when contacts 12 are closed. The voltage from the AC source is rectified and regulated by a rectifier/regulator circuit 14. When the rotor attains a speed at or near synchronous speed, switch 15 is closed and current from rectifier/regulator 14 is provided to exciter 16. Circuit 14 and switch 15 provide current to field winding 16 in the well known manner. The AC voltage applied to main stator winding 10 causes the rotor of the synchronous machine to rotate during start-up by well known induction principles, as by damper bars used as a squirrel cage. When a current is provided to exciter field winding 16, a voltage is induced in the exciter armature winding 18. The voltage from exciter armature winding 18, which consists of single windings 18-1, 18-2 and 18-3, is rectified by diodes 20, 22 and 24, and the resulting DC current is applied to main field rotor winding 26 to maintain synchronization of the rotor with the voltage in the main stator winding 10 for synchronous operation.

Main field rotor winding 26 is utilized near or at synchronous speed and must be short-circuited during start-up to prevent damage to electronic components, as for example diodes 20, 22 and 24. If it is not shorted during start-up, large induced currents are developed as a result of the voltage induced in the main field rotor winding 26 by main stator winding 10. The short circuit is removed from the main field rotor winding at or near synchronous speed. As the rotor rotates, lead 28 and lead 30 from main field rotor winding 26 alternately change in polarity from plus to minus as a result of the voltage induced by main stator winding 10. When lead 28 is positive, current flows through resistor 32 and provides a positive voltage at the base of transistor 34 with respect to lead 30, turning transistor 34 ON, and forward-biasing transistor 36, turning it ON to thereby short main field winding 26. Transistor 34 is an active semiconductor device having a base 34-$b$, emitter 34-$e$ and collector 34-$c$. The base, emitter and collector of the transistor in the circuit are similarly labeled in the drawings.

For purposes of this invention, the term transistor does not include SCR's or any other member of the thyristor family of semiconductors.

When the induced voltage from main stator winding 10 changes the polarity of the voltage in main field winding 26 (i.e., lead 28 being negative and lead 30 being positive), the voltage across main field winding 26 is limited by diodes 20, 22 and 24. Specifically, current flows from lead 30 through exciter armature winding 18, through the respective diodes 20, 22 and 24, and returns to lead 28 of main field winding 26. Also, transistors 34 and 36 are off since their base-emitter junction is reverse-biased while the polarity across main field rotor winding 26 is reversed from that shown.

Voltage provided by exciter armature winding 18 is rectified by diodes 38, 40 and 42, providing a negative voltage with respect to lead 30 at their anode terminals. The voltage across resistor 44 is of a level sufficient to overcome the forward-biasing of the base-emitter junctions of transistors 34 and 36, turning off the transistors. The values of resistors 32 and 44 are selected so that the voltage at the base of transistor 34 is biased negatively when the voltage from exciter armature 18 is received. As long as a voltage is provided by exciter armature winding 18, transistors 34 and 36 will remain off, removing the short across the main field rotor winding 26.

Thus, considering the operation of the circuit from start-up to synchronous speed, a short is applied across main field rotor winding 26 for the positive portion of the voltage induced by main stator winding 10. The current flow through main field rotor winding 26 is limited by diodes 20, 22 and 24 when the voltage across main field rotor winding 26 is negative. When the rotor reaches a speed at or near synchronous speed, switch 15 becomes closed and a voltage from exciter armature 18 causes transistors 34 and 36 to be biased off.

Referring to FIG. 2, waveforms depict the operation of the circuit when a voltage is provided from exciter armature winding 18. Specifically, exciter output voltages are shown to be half-wave rectified to develop the voltage across resistors 32 and 34. The voltage across resistors 32 and 34 is the difference between the positive half-wave rectified voltage and the negative half-wave rectified voltage, as shown.

Referring to FIG. 3, an alternate rotor short-circuiting switch is shown and its operation is similar to the circuit shown in FIG. 1. The circuit is particularly useful when a single winding of the exciter armature (as single winding 18-1 disconnected from 18-2 and 18-3 is used to provide a negative bias supply. During start-up, main stator winding 10 induces a voltage in main field rotor winding 26 in a manner similar to that discussed above. The polarity of the voltage induced in main field winding 26 alternates between plus to minus on leads 28 and 30.

When the voltage on lead 28 is positive with respect to the voltage on lead 30, current flows through resistors 46 and 48 through a set of diodes 50, 52 and 54 and through a set of diodes 56, 58 and 60, and returns to lead 30 of main field rotor winding 26. The base-emitter junction of transistor 62 is forward-biased, rendering transistor 62 conductive to short the main field winding 26.

When the voltage induced in the main field winding 26 reverses polarity, as lead 30 being more positive then lead 28, current flows through a set of diodes 64, 66 and 68 and through a set of diodes 70, 72 and 74, returning to lead 28 of main field rotor winding 26. This limits the voltage developed across main field rotor winding 26 when lead 30 is more positive than the potential of lead 28.

The voltage developed by the individual winding 18-1 of the exciter armature winding is rectified by diodes 54 and 74, causing a voltage drop to appear across resistors 46 and 48. The voltage across resistor 48 overcomes the forward-biasing of transistor 62 as established by resistor 46, and transistor 62 turns off.

Although a single winding, 18-1, is shown connected to the circuit, it should be apparent that the other single windings, as 18-2 and 18-3 of the exciter armature winding 18, can be similarly connected, as shown by the dotted lines and components.

I claim:

1. In a synchronous machine having a main stator winding, an exciter field winding, and a rotor on which is mounted a main field rotor winding and an exciter armature winding, an improved circuit for shorting the main field rotor winding comprising:

a transistor for shorting the main field rotor winding when the voltage across the main field rotor winding is of one polarity;

diode means for limiting the voltage across the main field winding when the polarity of the voltage across the main field rotor winding is of the other polarity; and means for rendering the transistor inoperative when a voltage is received from the exciter armature.

2. The synchronous machine of claim 1 wherein the transistor has a base, emitter and collector, the emitter and collector connected across the main field rotor winding, the improved circuit further including:

a second transistor having a base, emitter and collector, the collector and the emitter of the second transistor connected between the base and the collector of the first transistor, the base of the second transistor connected to said means for rendering the transistor inoperative.

3. The synchronous machine of claim 1 wherein the transistor has a base, emitter and collector, the emitter and collector are connected across the main field rotor winding; and the base is coupled to said means for rendering the transistor inoperative.

4. The synchronous machine of claim 1 wherein the means for rendering the transistor inoperative include:

diode means coupled to the exciter armature winding; and a first and a second resistor connected in series between the diode means and the main field rotor winding.

5. The synchronous machine of claim 1 wherein the diode means are connected in series with the main field rotor winding and the exciter armature winding.

6. In a synchronous machine having a main stator winding, an exciter field winding, and a rotor on which is mounted a main field rotor winding and an exciter armature winding, an improved circuit for shorting the main field rotor winding comprising:

a first transistor having a base, emitter and collector, the emitter and collector connected across the main field rotor winding;

a second transistor having a base, emitter and collector, the emitter and the collector of the second transistor connected between the collector and the base of the first transistor;

a first, second and third diode each connected in series with the exciter armature winding and the main field rotor winding;

a first resistor connected between the main field rotor winding and the base of the second transistor; and a second resistor coupled between the base of the second transistor and a fourth, fifth and sixth diode, each of which is coupled to the exciter armature winding.

7. In a synchronous machine having a main stator winding, an exciter field winding, and a rotor on which is mounted a main field rotor winding and an exciter armature winding, an improved circuit for shorting the main field rotor winding comprising:

a transistor having a base, emitter and collector, the emitter and the collector connected across the main field rotor winding;

a first and a second set of three diodes connected in series between the main field rotor winding and the exciter armature winding;

a first resistor connected between the base and the collector of the transistor;

a second resistor coupled to a third set of three diodes, each of which is connected to the exciter field winding; and a fourth set of three diodes, each diode connected in series between the main field rotor winding and the exciter armature winding.

* * * * *